(12) United States Patent
Kato et al.

(10) Patent No.: US 6,488,311 B2
(45) Date of Patent: Dec. 3, 2002

(54) INTEGRALLY WOVEN AIRBAG

(75) Inventors: Masayuki Kato, Kariya (JP); Hiroyasu Saiki, Kariya (JP); Choko Tanabe, Aichi-ken (JP)

(73) Assignees: Toyoda Boshoku Corporation, Aichi (JP); Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/789,746

(22) Filed: Feb. 22, 2001

(65) Prior Publication Data
US 2001/0020780 A1 Sep. 13, 2001

(30) Foreign Application Priority Data
Feb. 22, 2000 (JP) .......................... 2000-107336

(51) Int. Cl.[7] .............................................. B60R 21/16
(52) U.S. Cl. ................... 280/743.1; 139/389; 428/35.2; 428/36.1
(58) Field of Search .................. 280/743.1; 139/384 R, 139/389; 428/35.2, 36.1

(56) References Cited

U.S. PATENT DOCUMENTS

| | | | |
|---|---|---|---|
| 4,668,545 A | * 5/1987 | Lowe | .................. 428/35.1 |
| 5,011,183 A | 4/1991 | Thornton et al. | |
| 5,098,125 A | 3/1992 | Thornton et al. | |
| 5,213,363 A | * 5/1993 | Fukumori et al. | ....... 280/743.1 |
| 5,265,903 A | 11/1993 | Kuretake et al. | |
| 5,651,395 A | * 7/1997 | Graham et al. | ............. 139/390 |
| 5,685,347 A | 11/1997 | Graham et al. | |
| 5,707,711 A | * 1/1998 | Kitamura | ................. 280/743.1 |
| 5,865,464 A | 2/1999 | Kanuma et al. | |
| 6,220,309 B1 | * 4/2001 | Sollars, Jr. | .................. 139/389 |

FOREIGN PATENT DOCUMENTS

| | | | |
|---|---|---|---|
| DE | 4226317 A1 | * | 10/1993 |
| JP | 04193646 A | * | 7/1992 |
| JP | 05078946 A | * | 3/1993 |
| JP | 5-193430 | | 8/1993 |
| JP | 10109607 A | * | 4/1998 |
| JP | 2000016211 A | * | 1/2000 |

* cited by examiner

Primary Examiner—Lanna Mai
Assistant Examiner—Ruth Ilan
(74) Attorney, Agent, or Firm—Oliff & Berridge, PLC

(57) ABSTRACT

An integrally woven airbag includes a hollow portion with two opposing sides formed in a first weave pattern and a single-cloth portion where the two opposing sides are woven together as a single cloth. The single-cloth portion is formed by a 3/n basket weave, where n is one in the boundary portion and is an integer greater than one in a portion of the single-cloth portion excluding the boundary portion. A cover factor of the single-cloth portion is at least 4100.

6 Claims, 1 Drawing Sheet

INTEGRALLY WOVEN AIRBAG

INCORPORATION BY REFERENCE

The disclosure of Japanese Patent Application No. 2000-107336 filed on Feb. 22, 2000 including the specification, drawings and abstract is incorporated herein by reference in its entirety. The disclosure of U.S. Pat. No. 5,011,183 including the specification, drawings and abstract is incorporated herein by reference in its entirety.

BACKGROUND OF THE INVENTION

1. Field of the Invention

The invention relates to an airbag.

2. Description of the Related Art

Airbags are lately put to various uses. Examples of the uses are lifesaving jackets, life boats, mats, home elevators that utilize the expansion and shrinkage of airbags as a lift function, etc. In particular, airbags have been considered suitable for and have been used as airbags for protecting heads and chests of occupants in a vehicle by deploying at the time of a crash of the vehicle.

Airbags need to instantly inflate by taking air into a hollow portion. Particularly, where an airbag is used as a vehicular airbag, it is desirable to deploy the airbag rapidly at the time of a vehicle accident, for example, an accident in which the vehicle receives a side impact, or in which the vehicle rolls over. In particular, as head-protecting airbags, airbags for protecting side portions of occupants' bodies from pillars or seat side portions of a vehicle are lately installed in an increasing number of vehicles. Japanese Laid-Open Patent Application No. 5-193430 discloses an art in which an airbag mounted in a portion above a side window of a motor vehicle is deployed downward to protect a side portion of an occupant's head.

Many of these airbags employ integrally woven airbags, i.e., airbags that are woven together as one piece and thus do not require sewing or another joining method at an edge position where sides of the airbag meet. A very significant issue of integrally woven airbags is to secure a certain duration during which the airbag remains deployed. More specifically, there is a danger of insufficient strength of or air leakage from a boundary portion between a hollow portion and a single-cloth portion due to the opening of integrally woven caused by air pressure occurring in the air bag during the bag deployment. It is important to reduce this undesired phenomenon. In order to reduce air leakage during the deployment of an integrally woven airbag, there is a related art, for example, in which the aforementioned boundary portion is coated with a silicone resin or the like.

If the aforementioned boundary portion of an integrally woven airbag is provided with a firm texture, that is, a dense texture, yarns are naturally concentrated in the boundary portion, so that the boundary portion becomes protruded in comparison with other portions of the fabric, resulting in a projected-and-depressed or irregular surface. The presence of projections and depressions in a fabric may cause uneven coating particularly in the boundary portion during the resin coating of the fabric surface, thus causing undesired effects. Furthermore, a dense boundary portion degrades the fabric flexibility of the boundary portion, thereby resulting in deterioration in foldability. Foldability deterioration is undesirable because it is preferable that the installation space for an airbag be as small as possible.

SUMMARY OF THE INVENTION

Accordingly, it is an object of the invention to secure a low air permeability in an integrally woven airbag while flattening a boundary portion without forming a projected-and-depressed surface.

One mode of the invention is an integrally woven airbag characterized in that a texture of a hollow portion corresponds to 1 to 12 and A to K in each one of FIG. 1 and FIG. 2 illustrating a minimum component unit of a weave texture, and that a texture of a single-cloth portion corresponds to 1 to 12 and L, a and b in each one of FIG. 1 and FIG. 2, where a and b represent equal numbers of warp yarns, and assume an integer greater than one, and that a texture of a boundary portion is formed by 1 to 12 and L of the texture of the single-cloth portion indicated in each one of FIG. 1 and FIG. 2, and that a cover factor of the texture of the single-cloth portion is at least 4100.

In both FIG. 1 and FIG. 2, columns A to K form the hollow portion (a minimum repetition unit illustrated), and column L shows the texture of the boundary portion (a minimum repetition unit), and columns L, a and b show the texture of the single-cloth portion (a minimum repetition unit). Both a and b represent equal numbers of warp yarns, and assume an integer greater than one. In both FIG. 1 and FIG. 2, weft yarns are indicated by shading, and warp yarns are indicated by blanks. It should be appreciated that "warp" and "weft" are interchangeable; e.g., if FIGS. 1 and 2 are rotated 90°, then the columns currently considered as warp yarns may be considered as weft yarns and vice versa.

In an integrally woven airbag in accordance with a first mode of the invention, the hollow portion may be woven in a hollow-weave. Thus, the weave texture has a specific pattern. The texture, or pattern, of the single-cloth portion has, for example, or pattern, that is generally termed 3/2 basket weave texture, 3/3 basket weave texture, or 3/4 basket weave texture. With regard to the retention of internal pressure of the airbag, a warp stitch length in the single-cloth portion texture that is greater than 3 weft yarns is expected to increase the opening of stitches caused by the internal pressure of the airbag. If the warp stitch length is shorter than 3 weft yarns, the production of the hollow-weave airbag becomes rather difficult. The number of warp yarns corresponding to the weft stitch length in the texture of the single-cloth portion can be 2 or greater, as can be understood from the aforementioned "3/2 basket weave texture, 3/3 basket weave texture, or 3/4 basket weave texture". As for the texture of the single-cloth portion, the 3/3 basket weave is most preferable in view of the ease of production, taking into consideration the connection to the texture of the boundary portion described below. Furthermore, it is preferable that in the single-cloth portion texture, the texture of a boundary to the texture of the hollow portion part of be the basket weave texture of the single-cloth portion, but include only one yarn running parallel to the hollow portion. The term "one yarn" herein means that the number of yarns counted in a direction from the hollow portion toward the single-cloth portion is one. In addition to this condition, it is also preferable that the cover factor of the single-cloth portion is at least 4100. Correspondingly, the cover factor of the hollow portion is about one half of 4100. Furthermore, it has been found that the multiplier effect of the combination of the aforementioned weave structures and the value of cover factor of the single-cloth portion texture prevents air leakage from the boundary portion of the hollow weave, and reduces formation of a projected-and-depressed surface of the boundary portion of the fabric.

In the above-described mode, an outer surface of the hollow portion and an outer surface of the boundary portion may be coated with a layer of a rubber or a resin. Since this rubber or resin layer is provided on a smoothed boundary portion, uneven coating on the boundary portion is reduced. Therefore, the air leakage from the boundary portion occurring at the time of inflation and deployment of the airbag can be reduced. Furthermore, since the thus-coated airbag allows only a very small amount of air leakage, the airbag is suitable as a generally termed head-protecting airbag that is secured to a peripheral edge portion of a side window of a vehicle and that, when inflated, comes to a position between the window and an occupant.

An airbag of the invention may be subjected to scouring or thermosetting and, furthermore, to calendering on one or both side surfaces of a base cloth by a known method if necessary or desired, as long as features of the invention are not lost. In particular, for use as a vehicular airbag, it is preferable to reduce the air permeability by shrinking a base cloth by thermosetting or calendering to such an extent that the base cloth does not harden. In order to reduce the air permeability, it is particularly preferable to provide a coating layer of a rubber or resin, such as silicone rubber, polychloroprene rubber, urethane, etc. Since a calendered airbag has a smooth surface, the calendered airbag is particularly suitable for the coating of a thin-layer resin layer.

Furthermore, in a case where a different single yarn is mixed, as a rip stop, into a portion of the airbag, advantages of the invention can be achieved provided that the single yarn used substantially meets the requirements of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a diagram illustrating a minimum component unit of a weave texture in accordance with an embodiment of an integrally woven airbag of the invention; and FIG. 2 is a minimum component unit of a weave texture in accordance with another embodiment of an integrally woven airbag of the invention.

DETAILED DESCRIPTION OF PREFERRED EMBODIMENTS

Preferred embodiments of the invention will be described in detail hereinafter.

Figures 1, 2:
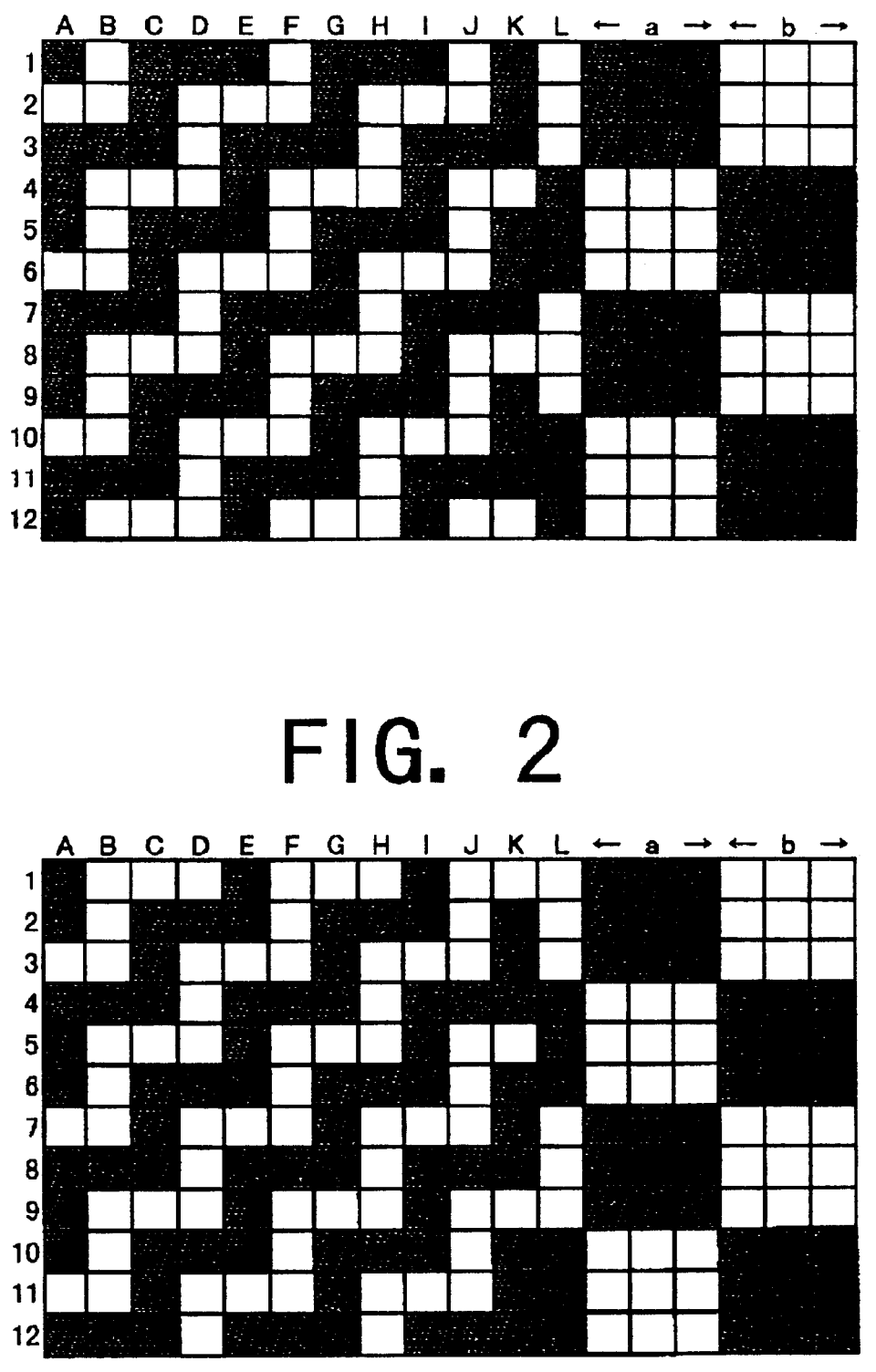

FIG. 1 is illustrates an example of a minimum component unit of a weave texture of an integrally woven airbag in accordance with an embodiment. FIG. 2 illustrates an example of a minimum component unit of a weave texture of an integrally woven airbag in accordance with an embodiment that is different from the weave texture shown in FIG. 1.

Referring to FIGS. 1 and 2, a hollow portion texture corresponds to 1 to 12 and A to K, and a single-cloth portion texture corresponds to 1 to 12 and L, a, b, where a and b represent equal numbers of warp yarns, and assumes an integer greater than 1. In FIGS. 1 and 2, the hollow portion (represented by 1 to 12 and A to K) is woven in a hollow-weave pattern. In the single-cloth portion (represented by a to 12 and 1, a, b), a and b are each shown to have three warp yarns, but any integer greater than 1 is acceptable. Thus, the single-cloth portion has a 3/n basket weave texture, where "3" represents the number of weft yarns, which run in a horizontal direction in the figure, and "n" represents the number of warp yarns, which run in a vertical direction in the figure. As described above, if FIGS. 1 and 2 are rotated 90°, then the columns currently considered as warp yarns may be considered as weft yarns and vice versa.

The value of n is one in the boundary region, and is preferably constant throughout the single-cloth portion excluding the boundary portion, e.g., n is the same in a and b, for the following reason. If n is not constant throughout portions a and b, e.g., if the a portion is a 3/2 basket weave and the b portion is a 3/5 basket weave, then there will be projections and depressions on the surface of the single-cloth portion. These projections and depressions may cause unevenness in a resin coating applied to the single-cloth portion, and/or may reduce foldability of the airbag in the single-cloth portion.

A boundary portion texture is formed by 1 to 12 and L of the single-cloth portion texture. The boundary portion (represented by 1 to 12 and L) is part of the 3/n basket weave pattern of the rest of the single-cloth portion, but only has a single warp yarn, represented by column L. Thus, it can be said that the 3/n basket weave pattern of the single-cloth portion is "incomplete" in the boundary portion, since there is only one warp yarn, rather than a plurality of warp yarns. In FIGS. 1 and 2, the weft yarns are indicated by shading, and the warp yarns are indicated by blanks.

The difference between FIG. 1 and FIG. 2 is that the single-cloth portion is shifted one thread on the vertical direction with respect to the hollow portion. Thus, it should be understood that the vertical position of the single-cloth portion with respect to the hollow portion is arbitrary.

Properties of the embodiments are values measured as described below.

The yarn density is expressed in the unit of the number of yarns/inch.

A cover factor CF of a base cloth is defined by the following expression.

$$CF = Nw \times \sqrt{(Dw)} + Nf \times \sqrt{(Df)}$$

where Nw is warp density (number of yarns/inch); Dw is warp yarn fineness (denier); Nf is weft density (number of yarns/inch); and Df is weft yarn fineness (denier).

The air permeability of a base cloth was measured according to JIS-L-1096 (Frazier method). That is, the air permeability (L/min) at 10 kPa is indicated. Air permeabilities below 4 (L/min) were considered good, and are indicated by "O". Air permeabilities of 4 to 4.5 (L/min) were considered slightly poor, and are indicated by "Δ". Air permeabilities equal to or greater than 4.5 (L/min) were considered poor, and are indicated by "x". The "air permeability" herein is a value measured by using a measurement concept as follows. That is, using a base cloth portion that is formed only by a hollow portion texture with no resin coating on the outer surfaces, a circular portion of the base cloth having a diameter of 28 mm is prepared by clamping a peripheral portion of the circular portion with dies while tightly sealing the peripheral portion. Then, an air permeability of the circular portion of the base cloth at 10 kPa is measured, thereby obtaining a measured value 1. Next, another circular portion of 28 mm in diameter, including a spread-apart hollow-portion and a boundary portion, is prepared by clamping a peripheral portion of the circular portion with the dies while tightly sealing the peripheral portion in such a fashion that the boundary portion comes to a center axis of the circular portion. Air is caused to flow through the circular portion from a circular surface thereof corresponding to the inner surface of the hollow portion to the other circular surface corresponding to the outer surface of the hollow portion, that is, a circular surface where the boundary portion texture is protruded. In this manner, an air permeability of the circular base cloth portion at 10 kPa is measured, thereby obtaining a measured value 2. The value obtained by subtracting the measured value 2 from the measured value 1 is determined as an air permeability of the boundary portion.

The irregularity feel of a boundary portion was evaluated as follows. That is, if the difference between a base cloth thickness of the boundary portion and a base cloth thickness of a portion of the single-cloth portion texture other than the boundary portion was at least 0.05 mm, it was considered that there was an irregularity feel, which case is indicated by "x". If the base cloth thickness difference is less than 0.05 mm, it was considered that there was no irregularity feel, which case is considered good and is indicated by "O".

EXAMPLES OF THE INVENTION AND COMPARATIVE EXAMPLES

Tables 1 and 2 show lists of evaluations of Examples of the invention and Comparative Examples.

Using the weave textures shown in Table 1, non-coated base cloths for head-protecting airbags were formed. With regard to the base cloths, the air permeability and the form of the boundary portion were evaluated.

Furthermore, the two opposite surfaces of each non-coated base cloth were coated with a colored thermosetting silicone rubber in an amount of 120 g/m². Based on color unevenness, the state of coating was evaluated. After that, each base cloth was cut, and a head-protecting airbag was formed therefrom. Each airbag was folded in a top-and-bottom direction, and then was secured to a peripheral edge portion of a side window of a vehicle extending from a front pillar to a rearward roof side rail. Then, each airbag was inflated and deployed downward in a curtain-like fashion so as to come to a position between the window and an occupant, by introducing gas from the inflator into the airbag. The internal airbag pressure occurring 3 seconds after the ignition of the inflator was measured. Results are shown in Table 2.

With regard to Table 1, the warp and weft yarns used were nylon 66 multi-filament yarns having a material yarn strength of at least 8.0 g/denier. The total finenesses of the warp yarns and the weft yarns were both 420 deniers. In both Examples, the yarn density in the single-cloth portion was 108×100 in warp×weft. Therefore, cover factor (CF)≧4263 is provided by a simple calculation. However, taking it into consideration that an ordinary yarn density tolerance is 4 yarns both in warp and weft, a minimum yarn density becomes 104×96 in warp×weft. Since the minimum yarn density provides a CF of about 4100, cover factor (CF) ≧4100 was determined to be desirable.

In connection with the total evaluation in Table 1, the woven cloths about which good "O" was given in both the air permeability and the irregularity feel were regarded as Examples. If good "O" was not given in either one of the air permeability and the irregularity feel, poor "x" was given as a total evaluation.

From Table 2, it can be understood that the irregularity feel of a base cloth greatly affects the state of coating on the base cloth. It has also been found that the cover factor (CF), the air permeability and the state of coating greatly affect the retained internal pressure of the bag.

The results shown in Table 2 verify that the head-protecting airbags of Examples of the invention had less air leakage after being inflated and deployed, and therefore had sufficient internal pressure retaining characteristics.

Reference Example in Tables 1 and 2 should be noted. Reference Example did not have a boundary portion texture, and therefore did not have an irregular portion, that is, a protruded-and-depressed portion, either. However, Reference Example had an extremely poor air permeability, compared with Comparative Examples. That is, a cloth having a boundary portion achieves an advantage that cannot be expected merely from a technical idea that a single-cloth portion texture is formed by a 3/3 basket weave.

Furthermore, it is preferable that the boundary portion of the single-cloth portion texture adjacent to the hollow portion texture be part of the 3/3 basket weave of the single-cloth portion, but have only one warp yarn (the yarn in column L), as described above. This is because if a boundary portion is formed by, for example, two yarns, the intermingling area having aligned warp and weft yarns becomes greater, and therefore air leakage is naturally considered to increase.

An airbag in accordance with the embodiments is able to reduce air leakage in the boundary portion, and is able to achieve a surface smoothness by reducing irregularity feel. Reducing irregularity feel in the boundary portion of an airbag achieves great advantages. That is, if used as a vehicle airbag, the airbag can be easily folded in both the directions of warp and weft of the base cloth, which means that the airbag is flexible. Thus, the airbag is easily disposed in a small housing space. Furthermore, being flexible leads to a soft impact on an occupant. Compared with a technical idea of simply increasing the density of the boundary portion, the invention also contributes to a weight reduction.

The airbag of the embodiments are applicable to lifesaving jackets, life boats, mats, and home elevators utilizing the expansion and shrinkage of an airbag as a lift function, for example. The airbag are particularly suitable as airbags for protecting the head or chest of an occupant in a vehicle or the like by deploying at the time of a crash of the vehicle.

While the invention has been described with reference to what are presently considered to be preferred embodiments thereof, it is to be understood that the invention is not limited to the disclosed embodiment, examples or constructions. To the contrary, the invention is intended to cover various modifications and equivalent arrangements.

a single-cloth portion, continuous from the hollow portion, at which the two opposing sides are woven together as a single cloth, the single-cloth portion being formed in a second weave pattern and having a cover factor of at least 4100, the second weave pattern being a 3/n basket weave pattern, where n indicates a number of yarns running parallel to the hollow portion, the single-cloth portion including a boundary portion that is adjacent to the hollow portion, wherein n is one in the boundary portion and is an integer greater than one in a portion of the single-cloth portion excluding the boundary portion.

TABLE 1

|  |  | Hollow portion texture | Single-cloth portion texture | | Yarn density (single-cloth portion texture) | CF of single-cloth portion texture | Air permeability Evaluation | Boundary portion | | Total evaluation |
|  |  |  | Boundary Portion Texture | Outer Periphery a = b = 3 | warp × weft |  |  | Thickness (mm) | Irregularity feel |  |
|---|---|---|---|---|---|---|---|---|---|---|
| Example | Construction A | Hollow weave | 3/3 basket weave, 1 yarn | 3/3 basket weave | 108 × 100 | 4263 | 3.05 ○ | 0.601 | ○ | ○ |
|  | Construction B | Hollow Weave | 3/3 basket weave, 1 yarn | 3/3 basket weave | 108 × 100 | 4263 | 2.23 ○ | 0.620 | ○ | ○ |
| Comparative Example | 1 | Hollow weave | 1/1 plain weave, 1 yarn | 3/3 basket weave | 98 × 98 | 4016 | 5.48 X | 0.635 | X | X |
|  | 2 | Hollow weave | 1/2 twill weave, 1 yarn | 3/3 basket weave | 104 × 98 | 4140 | 6.79 X | 0.685 | X | X |
|  | 3 | Hollow weave | 1/2 twill weave, 1 yarn | 3/3 basket weave | 108 × 98 | 4263 | 3.66 ○ | 0.695 | X | X |
|  | 4 | Hollow weave | 1/2 twill weave, 1 yarn | 3/3 basket weave | 108 × 100 | 4263 | 4.21 Δ | 0.666 | X | X |
| Reference Example |  | Hollow weave | None | 3/3 basket weave | 98 × 98 | 4016 | 6.71 X | 0.595 | ○ | X |

TABLE 2

|  |  | State of coating (note 1) | Pressure in airbag (kPa) (note 2) |
|---|---|---|---|
| Example | Construction A | ○ | 49 |
|  | Construction B | ○ | 49 |
| Comparative Example | 1 | X | 0 |
|  | 2 | X | 6 |
|  | 4 | X | 20 |
| Reference Example |  | ○ | ○ |

Note 1: Evaluation ○ indicates uniform coating without unevenness, and X indicates the presence of whitish stripe-like unevenn coating in portions of the hollow portion along the boundary portions.
Note 2: Pressure occurring in the airbag three seconds after the inflator ignition.

What is claimed is:

1. An integrally woven airbag, comprising:

a hollow portion including two opposing sides formed in a first weave pattern; and 2. An integrally woven airbag according to claim 1, wherein the first weave pattern is a hollow-weave pattern.

3. An integrally woven airbag according to claim 1, wherein an outer surface of the hollow portion and an outer surface of the boundary portion are coated with a coating material for reducing air leakage from the hollow portion and the boundary portion.

4. An integrally woven airbag according to claim 3, wherein the coating material is formed by a layer of a rubber or a resin.

5. A vehicle including an integrally woven airbag according to claim 1, wherein the hollow-weave airbag is secured to a periphery of a side window of the vehicle, and comes between the side window and an occupant when inflated.

6. An integrally woven airbag according to claim 1, wherein n is constant throughout the single-cloth portion excluding the boundary portion.

\* \* \* \* \*